United States Patent [19]

Oike et al.

[11] Patent Number: 4,671,375
[45] Date of Patent: Jun. 9, 1987

[54] POWER TRANSMISSION IN VEHICLES

[75] Inventors: Ikuo Oike; Toshikazu Hiasa, both of Saitama, Japan

[73] Assignee: Honda Giken Kogyo Kabushiki Kaisha, Tokyo, Japan

[21] Appl. No.: 764,946

[22] Filed: Aug. 12, 1985

[30] Foreign Application Priority Data

Aug. 13, 1984 [JP] Japan ............................ 59-169133
Mar. 7, 1985 [JP] Japan ............................ 60-45284

[51] Int. Cl.⁴ .......................................... B62K 25/04
[52] U.S. Cl. .................................. 180/227; 180/230
[58] Field of Search ............... 180/227, 230, 219; 280/284

[56] References Cited

U.S. PATENT DOCUMENTS 3,811,528 5/1974 Hooper ..................... 180/227 X
3,966,006 6/1976 Cullinan ................... 180/227 X
4,363,375 12/1982 Kamiya ....................... 180/227

FOREIGN PATENT DOCUMENTS 1477479 6/1977 United Kingdom ............... 280/227

Primary Examiner—John A. Pekar
Attorney, Agent, or Firm—Lyon & Lyon

[57] ABSTRACT

In a vehicle in which the power of a power plant carried on a body frame is transmitted to a driving wheel through a wrapping transmission mechanism, a pivot shaft is extended laterally of a vehicle body and secured fixedly to a body frame, the pivot ends of the swing arm for journaling the driving wheel is pivoted to the pivot shaft, the hanger portion of the power plant is also pivoted to the pivot shaft, the output shaft of the power plant being provided concentrically on the pivot shaft relatively rotatably, to which output shaft is secured a drive wheel of a wrapping transmission mechanism.

7 Claims, 2 Drawing Figures

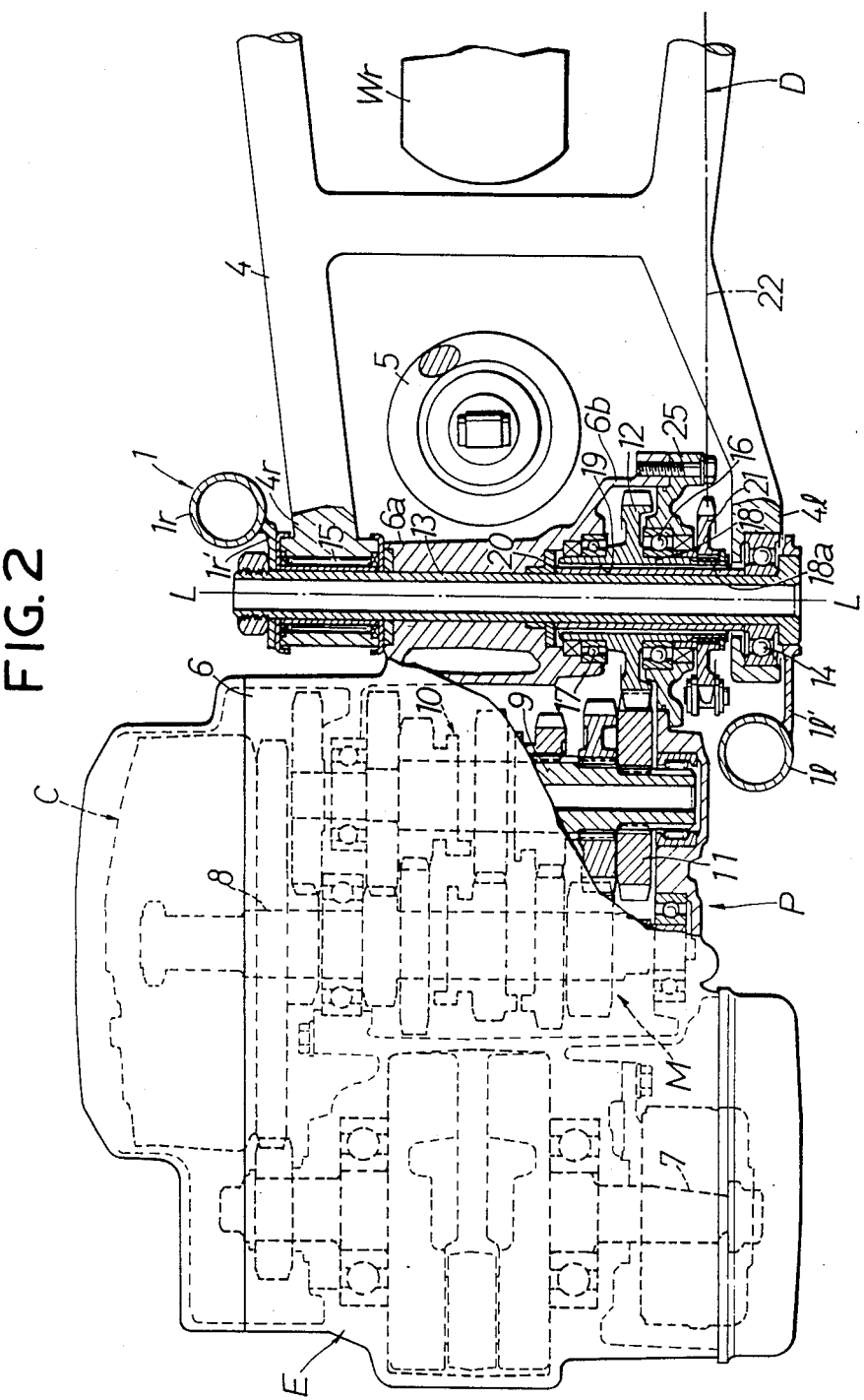

POWER TRANSMISSION IN VEHICLES

BACKGROUND OF THE INVENTION

1. Field of the Invention

The present invention relates to a power transmission in vehicles such as two-wheeled or three-wheeled motorcycles.

2. Description of the Prior Art

Vehicles such as a two-wheeled motorcycles in which a swing arm for journaling a driving wheel is pivotally supported to a body frame are known to employ the driving wheel coupled to the output member of a power plant through a continuous loop transmission mechanism. The fulcrum of the swing arm and the center of rotation of the drive wheel of such vehicles are known to be disposed concentrically to eliminate any slack in the endless transmission belt of the transmission mechanism during swinging motion of the swing arm. Such a device is disclosed in Japanese Utility Model Publication Kokoku No. 28759/1979, for example.

In such conventionally known motorcycles, the pivot shaft of the swing arm and the drive system of the continuous loop transmission mechanism are separately constructed. In such a device it is not only difficult to accurately bring the pivot fulcrum of the swing arm into coincidence with the center of drive wheel of the continuous loop transmission mechanism, but it is necessary to rigidly form the pivot shaft of the swing arm, to which relatively large loads such as an impact load are applied. This can cause an increase in the weight of the vehicle.

In addition, since it is necessary to associate the output member of a power plant with the drive wheel of a continuous loop transmission mechanism, the output member must extend backward to the vicinity of the swing arm. Thus, the area for installing a rear cushion for suspending the swing arm to the body frame is disadvantageously limited.

SUMMARY OF THE INVENTION

The present invention has been accomplished with the above circumstances in view, and its object is to provide a power transmission in vehicles, wherein the pivot fulcrum of a swing arm and the center of rotation of a continuous loop transmission mechanism can be easily and accurately brought into coincidence with each other. The pivot portion of the swing arm may be increased in strength by means of a pivot shaft, and the hanger portion of a power plant may be supported by the pivot shaft to reduce the number of components, thereby largely simplifying the entire construction without restricting the space for installing of other members.

To accomplish the above object, according to the present invention, there is provided a power transmission in vehicles in which a pivot shaft is laterally secured to a body frame. A hanger portion of a power plant to be carried on the body frame may be supported on the pivot shaft. A swing arm for journaling a driving wheel may be pivotally supported to the pivot shaft. The output shaft of the power plant may be disposed concentrically with the pivot shaft and can be secured with a drive wheel of a continuous loop transmission mechanism which is operatively connected to the driving wheel.

According to a feature of the present invention, the output shaft of the power plant and the drive wheel of the continuous loop transmission mechanism as secured to the output shaft are displaced on the pivot shaft toward one side in the lateral direction of the vehicle body, and a recess is formed on a rear portion of the hanger portion of the power plant.

With the above arrangements, since the pivot fulcrum of the swing arm journaling the driving wheel and the center of rotation of the drive wheel of the transmission mechanism for driving the driving wheel are readily brought into alignment on the same axis, and even if the swing arm is swung, no slack occurs at the endless transmission belt of the transmission mechanism thereby enhancing the power transmission efficiency and improving the durability of the whole power transmission. Further, the strength of the pivot portion of the swing arm can be largely enhanced by means of the pivot shaft, and the pivot shaft can be utilized also as a member supporting the power plant on the body frame, whereby the construction is simplified, the cost is reduced and the assembling property is improved.

In addition, by displacing the output shaft of the power plant and the drive wheel secured to the output shaft toward one side in the lateral direction of the body, and by providing a notch at the rear of the hanger portion, the space for installing a rear cushion is ensured.

The above and other objects, features and advantages of the present invention will become apparent from the following description of a preferred embodiment taken in conjunction with the accompanying drawings.

BRIEF DESCRIPTION OF THE DRAWINGS

The figures illustrate a power transmission in vehicles according to an embodiment of the present invention, wherein:

FIG. 2 is a cross sectional view of the power transmission.

DESCRIPTION OF THE PREFERRED EMBODIMENT

Figure 1:
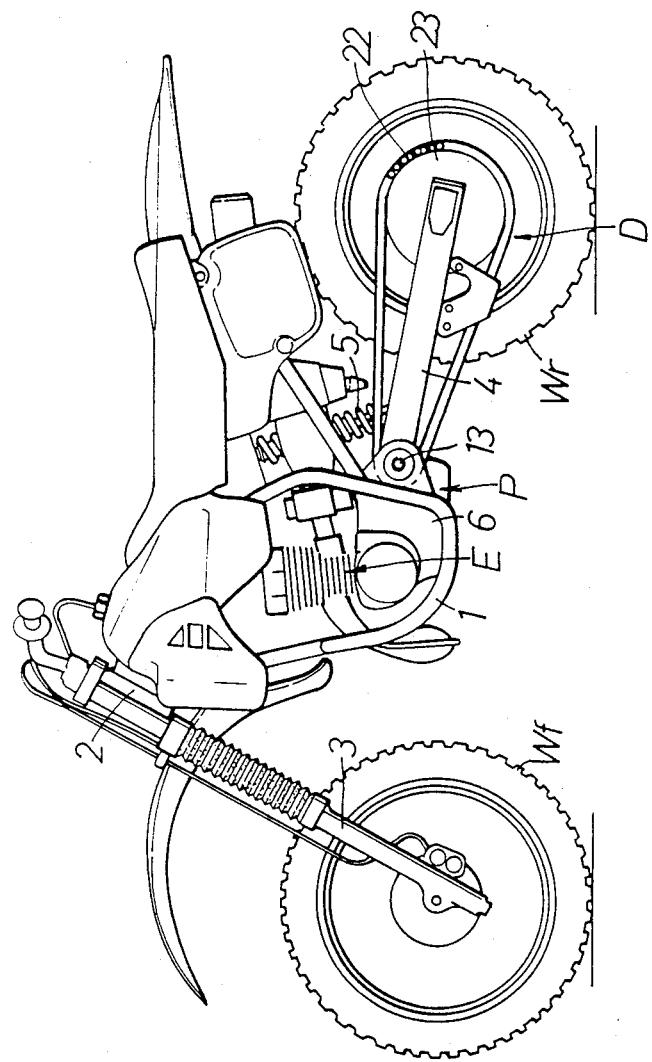
FIG. 1 is a side view of a motorcycle with a power transmission of the invention mounted thereon.

The present invention will now be described by way of an embodiment in which a power transmission according to the invention is applied to a motorcycle.

In FIG. 1, a power plant P is suspended on a body frame 1 of a motorcycle in a central portion between a front wheel Wf and a rear wheel Wr as a driving wheel. The front wheel Wf is, as usual, suspended to a front fork 3 supported steerably on a head pipe 2 of the body frame 1. The rear wheel Wr is suspended on the rear portion of a swing arm, that is, of a rear fork 4 vertically rockably supported on the rear of the body frame 1 by means of a later-described pivot shaft 13, and an intermediate portion of the rear fork 4 is suspended to the body frame 1 through a rear cushion 5.

The power plant P comprises an engine E, a clutch C and a transmission M which are constituted as a unit. A crankshaft 7 of the engine E, and main shaft 8 and countershaft 9 of the transmission M are rotatably supported in parallel with each other in a transmission casing 6 located at the lower portion of the power plant P. The crank shaft 7 and the main shaft 8 are interlocked through the clutch C, and the main shaft 8 and the countershaft 9 are interlocked through a speed change gear group 10 as usual.

The transmission line extending from the crank shaft 7 to the countershaft 9 is conventionally known and so detailed description thereof will be omitted here.

A final drive gear 11 is secured to one end of the countershaft 9, and is always in mesh with an output gear 12 to be described later.

A hanger portion 6a is integrally extended rearward from the lateral center portion of the transmission casing 6, and a hollow pivot shaft 13 is disposed substantially parallel to the countershaft 9 so as to be passed through the hanger portion 6a. The pivot shaft 13 is located in the lateral direction of the vehicle and is secured at both ends to bottom plates 1l', 1r' extending integrally rearward and forward from left and right frame pipes 1l, 1r of the body frame 1. Therefore, the hanger portion 6a of the transmission casing 6 is supported to the body frame 1 through the pivot shaft 13.

Front left and right pivot portions 4l, 4r of the swing arm or rear fork 4 are rotatably supported to the both ends of the pivot shaft 13 through bearings 14 and 15, so that the rear fork 4 is vertically rockable around the pivot shaft 13.

A housing 6b is integrally formed with the rear left side of the transmission casing 6 so as to swell rearward farther than the hanger portion 6a, and a cover 25 is attached to an opening side face of the housing 6b. The pivot shaft 13 crosses the housing 6b and passes through the cover 25. An output shaft 18 is rotatably supported in the housing 6b through bearings 16 and 17 and has a bore 19 penetrated by the pivot shaft 13 with a collar 20 interposed therebetween. The output gear 12 is fixed on the output shaft 18, and the gear 12 is meshed with the final drive gear 11 on the countershaft 9. The output shaft 18 is disposed together with the output gear 12 in a concentrical relation to the pivot shaft 13 and is displaced toward one axial side of the pivot shaft 13 to be rotatable around the central axis L—L of the pivot shaft 13.

One end, the outer left end of the output shaft 18 projects outward from the transmission casing 6, and is secured with a drive sprocket 21 at the outer projecting end 18a thereof. The drive sprocket 21 is operatively connected to a driven sprocket 23 (FIG. 1) secured to the rear wheel Wr through a continuous loop transmission member such as, for example, an endless transmission chain 22, and the drive sprocket 21, the endless transmission chain 22 and the driven sprocket 23 constitute a continuous loop transmission mechanism D.

The rear portion of the hanger portion 6a is recessed as compared with the housing 6b formed continuously on the left side thereby to provide a space in the rear portion, and the rear cushion 5 coupling the body frame 1 with the rear fork 4 is disposed in the space formed directly after the hanger portion 6a while avoiding the housing 6b.

The operation of the embodiment of the present invention will now be described.

When the motorcycle now travels, the rear fork 4 vertically rocks around the central axis L—L of the pivot shaft 13 together with the rear wheel Wr while forcing the rear cushion 5 to stretch and contract.

The power outputted from the engine E is transmitted from the crank shaft 7 to the countershaft 9 of the transmission M through the clutch C and the speed change gear group 10. The rotation of the countershaft 9 is transmitted to the drive sprocket 21 through the final drive gear 11 and the output gear 12, and further transmitted to the rear wheel Wr through the transmission chain 22 and the driven sprocket 23. Since the drive sprocket 21 rotates around the central axis L—L of the pivot shaft 13, no slack occurs in the transmission chain 22 of the continuous loop transmission mechanism D even if the rear fork 4 rocks vertically around the pivot shaft 13.

In the embodiment described above, the power transmission of the present invention has been applied to the rear wheel Wr rotatably supported on the rear fork 4. However, the present invention is not limited to the particular embodiment. For example, the power transmission of the present invention may also be applied even to a front driving wheel supported on the swing arm of the vehicle.

What is claimed is:

1. A power transmission in a vehicle in which a power plant having a rear hanger portion is mounted on a body frame having a pair of frame members extending downwardly generally aft of the engine, and the power of the power plant is transmitted to a driving wheel through a continuous loop transmission mechanism, wherein a pivot shaft is laterally secured to the body frame at the frame members, a hanger portion of the power plant is supported on the pivot shaft, a swing arm for journaling said driving wheel is swingably pivoted on the pivot shaft, the power plant has an output shaft disposed concentrically on the pivot shaft, and a drive wheel of the continuous loop transmission mechanism is secured to the output shaft, said hanger portion, said swing arm, said output shaft and said drive wheel being positioned between the pair of frame members and arranged on the pivot shaft.

2. The power transmission as claimed in claim 1, wherein said output shaft is displaced toward one side laterally of said vehicle and provided relatively rotatably on said pivot shaft.

3. The power transmission as claimed in claim 2, wherein said hanger portion is formed with a recess at a rear thereof.

4. A power transmission in a vehicle in which a power plant having a rear hanger portion is mounted on a body frame having a pair of frame members extending downwardly generally aft of the engine, and the power of the power plant is transmitted to a driving wheel through a continuous loop transmission mechanism, wherein a pivot shaft is laterally secured to the body frame at the frame members, a hanger portion of the power plant is supported on the pivot shaft, a swing arm for journaling said driving wheel is swingably pivoted on the pivot shaft, the power plant has an output shaft disposed concentrically on the pivot shaft, and a drive wheel of the continuous loop transmission mechanism is secured to the output shaft, said hanger portion, said swing arm, said output shaft and said drive wheel being positioned between the pair of frame members and arranged on the pivot shaft, said swing arm having a pair of right and left pivot portions, these pivot portions being rotatably journaled on said pivot shaft adjacent both ends of the pivot shaft, said hanger portion being provided on an axially intermediate portion of said pivot shaft between the pivot portions of said swing arm, said output shaft being provided between said hanger portion and one of said pair of pivot portions.

5. The power transmission as claimed in claim 4, wherein said hanger portion is formed with a recess at a rear thereof.

6. The power transmission as claimed in claim 5, wherein a cushion for suspending said swing arm to said body frame is disposed rearward of said hanger portion.

7. A power transmission in a vehicle in which a power plant having a rear hanger portion is mounted on a body frame having a pair of frame members extending downwardly generally aft of the engine, and the power of the power plant is transmitted to a driving wheel through a continuous loop transmission mechanism, wherein a pivot shaft is laterally secured to the body frame at the frame members, a hanger portion of the power plant is supported on the pivot shaft, a swing arm for journaling said driving wheel is swingably pivoted on the pivot shaft, the power plant has an output shaft disposed concentrically on the pivot shaft, and a drive wheel of the continuous loop transmission mechanism is secured to the output shaft, said hanger portion, said swing arm, said output shaft and said drive wheel being positioned between the pair of frame members and arranged on the pivot shaft, said swing arm having a pair of right and left pivot portions, these pivot portions being rotatably journaled on said pivot shaft adjacent both ends of the pivot shaft, said hanger portion being provided on an axially intermediate portion of said pivot shaft between the pivot portions of said swing arm, said output shaft being provided between said hanger portion and one of said pair of pivot portions, wherein said hanger portion is formed with a recess at a rear thereof, and a cushion for suspending said swing arm to said body frame being disposed rearwardly of said hanger portion.

* * * * *